US009091219B2

(12) United States Patent
Kar et al.

(10) Patent No.: US 9,091,219 B2
(45) Date of Patent: Jul. 28, 2015

(54) TORQUE CONTROL SYSTEM AND METHOD FOR ACCELERATION CHANGES

(75) Inventors: Krishnendu Kar, South Lyon, MI (US); Pahngroc Oh, Ann Arbor, MI (US); Andrew W. Baur, Whitmore Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1184 days.

(21) Appl. No.: 13/037,493

(22) Filed: Mar. 1, 2011

(65) Prior Publication Data

US 2012/0150399 A1 Jun. 14, 2012

Related U.S. Application Data

(60) Provisional application No. 61/422,437, filed on Dec. 13, 2010.

(51) Int. Cl.

| | |
|---|---|
| ***G06F 7/00*** | (2006.01) |
| ***G06F 17/00*** | (2006.01) |
| ***G06F 19/00*** | (2011.01) |
| ***F02D 11/10*** | (2006.01) |
| ***F02D 41/10*** | (2006.01) |

(52) U.S. Cl.

CPC ............ *F02D 11/105* (2013.01); *F02D 41/107* (2013.01); *F02D 2250/21* (2013.01)

(58) Field of Classification Search

CPC ................... B60W 2540/10; B60W 2540/103; B60W 2510/0661; B60W 2510/084

USPC ........... 701/22, 51, 54, 55, 70, 74, 78, 82, 85, 701/101, 102, 103, 110; 123/339.1, 399, 123/478, 480; 477/3, 5, 110, 111, 115

IPC ............ B60W 2540/10, 2540/103, 2510/0661, B60W 2510/084

See application file for complete search history.

(56) References Cited

U.S. PATENT DOCUMENTS

| | | | | |
|---|---|---|---|---|
| 4,964,318 | A | 10/1990 | Ganoung | |
| 5,954,779 | A | 9/1999 | Dietzel | |
| 6,266,597 | B1 * | 7/2001 | Russell et al. | 701/54 |
| 6,386,180 | B1 | 5/2002 | Gerhardt et al. | |
| 6,405,587 | B1 | 6/2002 | Livshiz et al. | |
| 6,754,573 | B2 * | 6/2004 | Russell et al. | 701/54 |
| 6,910,990 | B2 * | 6/2005 | Doering et al. | 477/110 |

(Continued)

FOREIGN PATENT DOCUMENTS

| | | | |
|---|---|---|---|
| JP | 2004100528 | A | 4/2004 |
| JP | 2004100528 | A * | 4/2004 |

*Primary Examiner* — Jason Holloway
*Assistant Examiner* — Rachid Bendidi

(57) ABSTRACT

A control system includes a driver torque determination module, a lash zone torque determination module, a rate limit determination module, and an immediate torque determination module. The driver torque determination module determines a driver torque request when a driver depresses an accelerator pedal while a vehicle is coasting. The lash zone torque determination module determines a lash zone torque based on a transmission gear and an engine speed. The rate limit determination module determines an adjustment rate limit based on a previous immediate torque request, the lash zone torque, and the transmission gear. The immediate torque determination module determines a present immediate torque request based on the driver torque request and selectively determines the present immediate torque request based on the adjustment rate limit.

20 Claims, 7 Drawing Sheets

(56) References Cited

U.S. PATENT DOCUMENTS

| | | | | |
|---|---|---|---|---|
| 6,945,910 | B1 * | 9/2005 | Cullen et al. | 477/176 |
| 7,249,583 | B2 * | 7/2007 | Bidner et al. | 123/198 DB |
| 7,463,970 | B2 | 12/2008 | Livshiz et al. | |
| 7,676,315 | B2 * | 3/2010 | Doering et al. | 701/87 |
| 7,698,049 | B2 | 4/2010 | Whitney et al. | |
| 7,917,275 | B2 * | 3/2011 | Doering et al. | 701/87 |
| 8,255,139 | B2 * | 8/2012 | Whitney et al. | 701/101 |
| 2002/0129788 | A1 | 9/2002 | O'Neil et al. | |
| 2005/0054482 | A1 * | 3/2005 | Doering et al. | 477/107 |
| 2009/0118935 | A1 * | 5/2009 | Heap et al. | 701/54 |
| 2009/0275440 | A1 * | 11/2009 | Doering et al. | 477/102 |
| 2009/0276137 | A1 | 11/2009 | Whitney | |
| 2010/0217472 | A1 * | 8/2010 | Stempnik et al. | 701/29 |
| 2011/0034298 | A1 * | 2/2011 | Doering et al. | 477/54 |

* cited by examiner

TORQUE CONTROL SYSTEM AND METHOD FOR ACCELERATION CHANGES

CROSS-REFERENCE TO RELATED APPLICATIONS

This application claims the benefit of U.S. Provisional Application No. 61/422,437, filed on Dec. 13, 2010. The disclosure of the above application is incorporated herein by reference in its entirety.

FIELD

The present disclosure relates to torque control systems and methods for improving driver feel when a driver manipulates an accelerator pedal.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired output torque. Increasing the amount of air and fuel provided to the cylinders increases the torque output of the engine.

In spark-ignition engines, spark initiates combustion of an air/fuel mixture provided to the cylinders. In compression-ignition engines, compression in the cylinders combusts the air/fuel mixture provided to the cylinders. Spark timing and air flow may be the primary mechanisms for adjusting the torque output of spark-ignition engines, while fuel flow may be the primary mechanism for adjusting the torque output of compression-ignition engines.

Engine control systems have been developed to control engine output torque to achieve a desired torque. Traditional engine control systems, however, do not control the engine output torque as accurately as desired. Further, traditional engine control systems do not control the engine output torque to achieve a desirable balance between improving acceleration feel and minimizing acceleration delay.

SUMMARY

A control system includes a driver torque determination module, a lash zone torque determination module, a rate limit determination module, and an immediate torque determination module. The driver torque determination module determines a driver torque request when a driver depresses an accelerator pedal while a vehicle is coasting. The lash zone torque determination module determines a lash zone torque based on a transmission gear and an engine speed. The rate limit determination module determines an adjustment rate limit based on a previous immediate torque request, the lash zone torque, and the transmission gear. The immediate torque determination module determines a present immediate torque request based on the driver torque request and selectively determines the present immediate torque request based on the adjustment rate limit.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
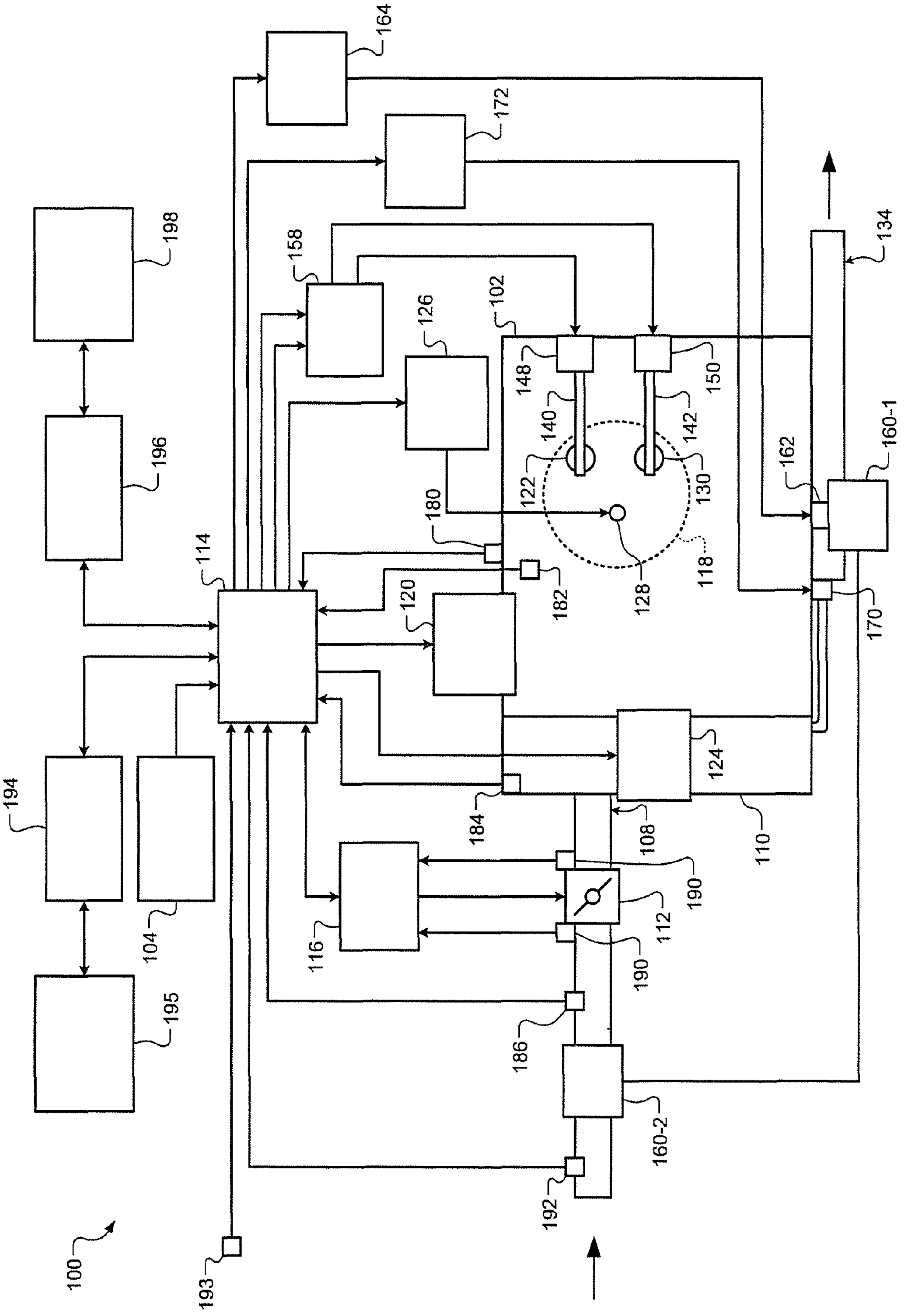
FIG. 1 is a functional block diagram of an example engine system according to the principles of the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

When a driver depresses an accelerator pedal while a vehicle is coasting, torque output of an engine system transitions through a lash zone. A lash zone is a torque value, or a torque range, corresponding to a transition of an engine system from being driven by the driveline to driving the driveline. During this transition, the driver may experience an undesirable feel such as bump or kick. Bump is an impact in the driveline caused by lash, which is the elimination of joint slack in the driveline. Kick is a sudden decrease in acceleration felt by the driver after an increase in acceleration. Bump and kick may be minimized by reducing the rate of acceleration. However, this may result in an acceleration response delay that is undesirable.

A torque control system and method of the present disclosure limits the rate of acceleration in the lash zone when a driver depresses an accelerator pedal while a vehicle is coasting to improve feel while minimizing response delay. A pleasibility mode is activated as a torque request approaches the lash zone and is deactivated after the torque request passes through the lash zone. In the pleasibility mode, a rate limit is applied to an adjustment rate of the torque request to limit the torque output of the engine system. The rate limit is determined based on engine operating conditions and a desirable balance between improving feel and minimizing response time.

Referring now to FIG. 1, a functional block diagram of an example engine system 100 is presented. The engine system 100 includes an engine 102 that combusts an air/fuel mixture to produce drive torque for a vehicle based on driver input from a driver input module 104. Air is drawn into the engine 102 through an intake system 108. For example only, the intake system 108 may include an intake manifold 110 and a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy under certain engine operating conditions.

The engine 102 may operate using a four-stroke cycle. The four strokes, described below, are named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122.

The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression in the cylinder 118 ignites the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Generating the spark may be referred to as a firing event. The spark actuator module 126 may have the ability to vary the timing of the spark for each firing event. The spark actuator module 126 may even be capable of varying the spark timing for a next firing event when the spark timing signal is changed between a last firing event and the next firing event.

During the combustion stroke, the combustion of the air/fuel mixture drives the piston down, thereby driving the crankshaft. The combustion stroke may be defined as the time between the piston reaching TDC and the time at which the piston returns to bottom dead center (BDC).

During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The cylinder actuator module 120 may deactivate the cylinder 118 by disabling opening of the intake valve 122 and/or the exhaust valve 130. In various other implementations, the intake valve 122 and/or the exhaust valve 130 may be controlled by devices other than camshafts, such as electromagnetic actuators.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. When implemented, variable valve lift (not shown) may also be controlled by the phaser actuator module 158.

The engine system 100 may include a boost device that provides pressurized air to the intake manifold 110. For example, FIG. 1 shows a turbocharger including a hot turbine 160-1 that is powered by hot exhaust gases flowing through the exhaust system 134. The turbocharger also includes a cold air compressor 160-2, driven by the turbine 160-1, that compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) of the turbocharger. The ECM 114 may control the turbocharger via a boost actuator module 164. The boost actuator module 164 may modulate the boost of the turbocharger by controlling the position of the wastegate 162. In various implementations, multiple turbochargers may be controlled by the boost actuator module 164. The turbocharger may have variable geometry, which may be controlled by the boost actuator module 164.

An intercooler (not shown) may dissipate some of the heat contained in the compressed air charge, which is generated as the air is compressed. The compressed air charge may also have absorbed heat from components of the exhaust system 134. Although shown separated for purposes of illustration, the turbine 160-1 and the compressor 160-2 may be attached to each other, placing intake air in close proximity to hot exhaust.

The engine system 100 may include an exhaust gas recirculation (EGR) valve 170, which selectively redirects exhaust gas back to the intake manifold 110. The EGR valve 170 may be located upstream of the turbocharger's turbine 160-1. The EGR valve 170 may be controlled by an EGR actuator module 172.

The engine system 100 may measure the speed of the engine 102 using an engine speed (ES) sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The speed of the vehicle powered by the engine system 100 may be measured using a vehicle speed (VS) sensor 193. The ECM 114 may use signals from the sensors to make control decisions for the engine system 100.

The ECM 114 may communicate with a transmission control module (TCM) 194 to coordinate shifting gears in a transmission 195. For example, the ECM 114 may reduce engine torque during a gear shift. The TCM 194 may provide transmission input to the ECM 114. The transmission input may include a transmission gear and a turbine speed. The ECM 114 may communicate with a hybrid control module (HCM) 196 to coordinate operation of the engine 102 and an electric motor 198.

The electric motor 198 may also function as a generator, and may be used to produce electrical energy for use by vehicle electrical systems and/or for storage in a battery. In various implementations, various functions of the ECM 114, the TCM 194, and the HCM 196 may be integrated into one or more modules.

Each system that varies an engine parameter may be referred to as an actuator that receives an actuator value. For example, the throttle actuator module 116 may be referred to as an actuator and the throttle opening area may be referred to as the actuator value. In the example of FIG. 1, the throttle actuator module 116 achieves the throttle opening area by adjusting an angle of the blade of the throttle valve 112.

Similarly, the spark actuator module 126 may be referred to as an actuator, while the corresponding actuator value may be the amount of spark advance relative to cylinder TDC. Other actuators may include the cylinder actuator module 120, the fuel actuator module 124, the phaser actuator module 158, the boost actuator module 164, and the EGR actuator module 172. For these actuators, the actuator values may correspond to the number of activated cylinders, fueling rate, intake and exhaust cam phaser angles, boost pressure, and EGR valve opening area, respectively. The ECM 114 may control actuator values in order to cause the engine 102 to generate a desired engine output torque.

The ECM 114 controls spark timing to limit the torque output of the engine system 100 in a lash zone when an accelerator pedal (not shown) is depressed. The lash zone is a torque value, or a torque range, corresponding to a transition of the engine system 100 from being driven by a driveline (not shown) to driving the driveline. By limiting engine output torque in the lash zone, the ECM 114 eliminates undesirable acceleration feel, such as bump or kick, while minimizing acceleration response time. Controlling spark timing to limit engine output torque allows the ECM 114 to quickly increase the engine output torque after the engine output torque passes through the lash zone. In turn, the acceleration response time may be further reduced.

Figure 2:
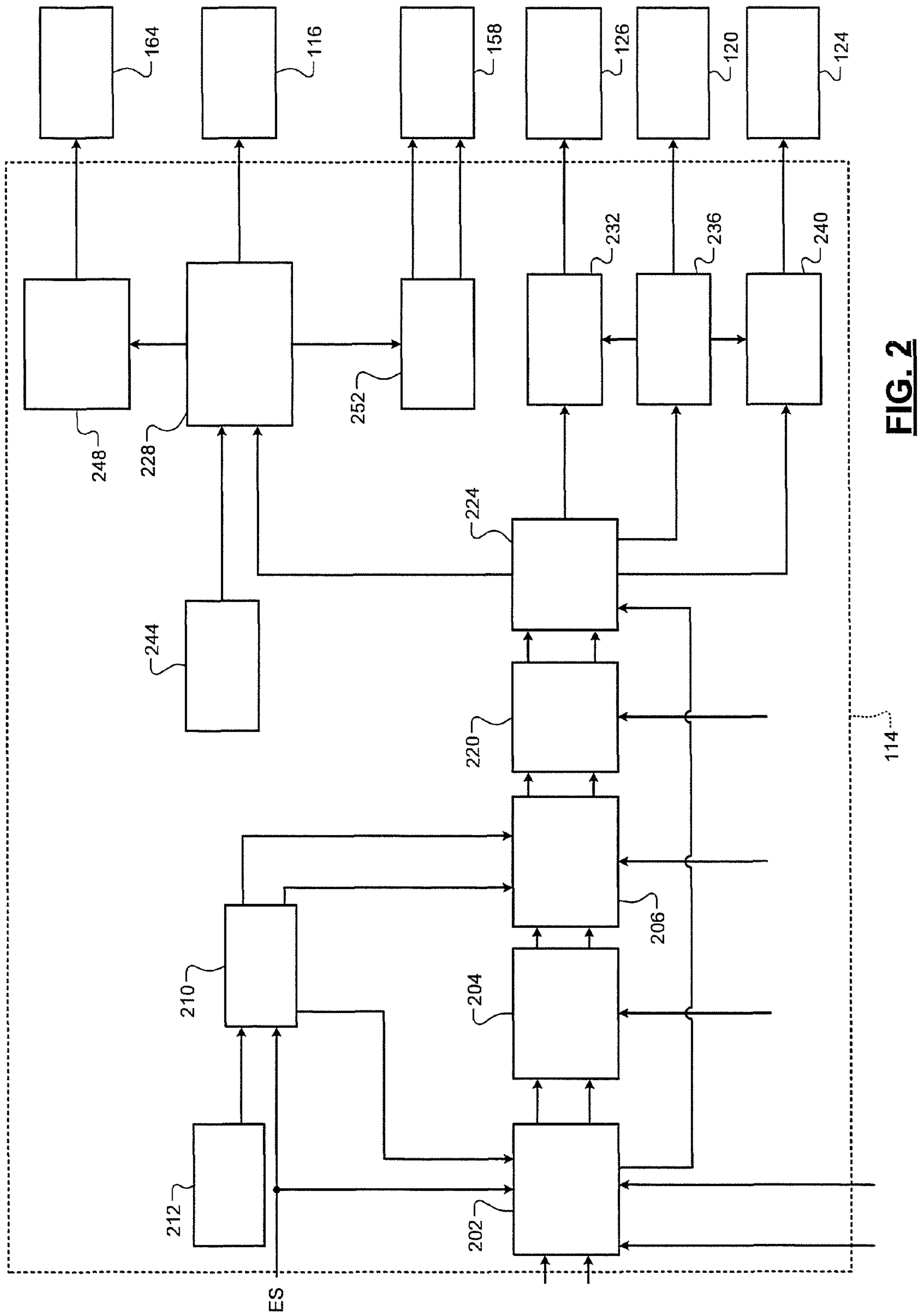
FIG. 2 is a functional block diagram of an example engine control system according to the principles of the present disclosure.

Referring now to FIG. 2, a functional block diagram of an example engine control system is presented. An example implementation of the ECM 114 includes a driver torque module 202. The driver torque module 202 may determine a driver torque request based on the driver input from the driver input module 104. The driver torque module 202 may determine a predicted torque request and an immediate torque request based on the driver torque request. The driver torque module 202 may shape the predicted and immediate torque requests when the driver depresses the accelerator pedal to eliminate bump and kick while minimizing response time.

An axle torque arbitration module 204 arbitrates between the predicted torque request and the immediate torque request from the driver torque module 202 and other axle torque requests. Axle torque (torque at the wheels) may be produced by various sources including an engine and/or an electric motor. Torque requests may include absolute torque requests as well as relative torque requests and ramp requests. For example only, ramp requests may include a request to ramp torque down to a minimum engine off torque or to ramp torque up from the minimum engine off torque. Relative torque requests may include temporary or persistent torque reductions or increases.

Axle torque requests may include a torque reduction requested by a traction control system when positive wheel slip is detected. Positive wheel slip occurs when axle torque overcomes friction between the wheels and the road surface, and the wheels begin to slip against the road surface. Axle torque requests may also include a torque increase request to counteract negative wheel slip, where a tire of the vehicle slips in the other direction with respect to the road surface because the axle torque is negative.

Axle torque requests may also include brake management requests and vehicle over-speed torque requests. Brake management requests may reduce axle torque to ensure that the axle torque does not exceed the ability of the brakes to hold the vehicle when the vehicle is stopped. Vehicle over-speed torque requests may reduce the axle torque to prevent the vehicle from exceeding a predetermined speed. Axle torque requests may also be generated by vehicle stability control systems.

The axle torque arbitration module 204 outputs a predicted torque request and an immediate torque request based on the results of arbitrating between the received torque requests. As described below, the predicted and immediate torque requests from the axle torque arbitration module 204 may selectively be adjusted by other modules of the ECM 114 before being used to control actuators of the engine system 100.

In general terms, the immediate torque request is the amount of currently desired axle torque, while the predicted torque request is the amount of axle torque that may be needed on short notice. The ECM 114 therefore controls the engine system 100 to produce an axle torque equal to the immediate torque request. However, different combinations of actuator values may result in the same axle torque. The ECM 114 may therefore adjust the actuator values to allow a faster transition to the predicted torque request, while still maintaining the axle torque at the immediate torque request.

In various implementations, the predicted torque request may be based on the driver torque request. The immediate torque request may be less than the predicted torque request, such as when the driver torque request is causing wheel slip on an icy surface. In such a case, a traction control system (not shown) may request a reduction via the immediate torque request, and the ECM 114 reduces the torque produced by the engine system 100 to the immediate torque request. However, the ECM 114 controls the engine system 100 so that the engine system 100 can quickly resume producing the predicted torque request once the wheel slip stops.

In general terms, the difference between the immediate torque request and the higher predicted torque request may be referred to as a torque reserve. The torque reserve may represent the amount of additional torque that the engine system 100 can begin to produce with minimal delay. Fast engine actuators are used to increase or decrease current axle torque. As described in more detail below, fast engine actuators are defined in contrast with slow engine actuators.

The difference between the immediate toque request and the actual torque output of the engine system 100 may also be referred to as a torque reserve. This difference may be equal to the difference between the immediate torque request and the higher predicted torque request when the engine system 100 is operating in steady-state conditions. Steady-state conditions may be present when the immediate torque request and the predicted torque request are held constant.

In various implementations, fast engine actuators are capable of varying axle torque within a range, where the range is established by the slow engine actuators. In such implementations, the upper limit of the range is the predicted torque request, while the lower limit of the range is limited by the torque capacity of the fast actuators. For example only, fast actuators may only be able to reduce axle torque by a first amount, where the first amount is a measure of the torque capacity of the fast actuators. The first amount may vary based on engine operating conditions set by the slow engine actuators. When the immediate torque request is within the range, fast engine actuators can be set to cause the axle torque to be equal to the immediate torque request. When the ECM 114 requests the predicted torque request to be output, the fast engine actuators can be controlled to vary the axle torque to the top of the range, which is the predicted torque request.

In general terms, fast engine actuators can more quickly change the axle torque when compared to slow engine actuators. Slow actuators may respond more slowly to changes in their respective actuator values than fast actuators do. For example, a slow actuator may include mechanical components that require time to move from one position to another in response to a change in actuator value. A slow actuator may also be characterized by the amount of time it takes for the axle torque to begin to change once the slow actuator begins to implement the changed actuator value. Generally, this amount of time will be longer for slow actuators than for fast actuators. In addition, even after beginning to change, the axle torque may take longer to fully respond to a change in a slow actuator.

For example only, the ECM 114 may set actuator values for slow actuators to values that would enable the engine system 100 to produce the predicted torque request if the fast actuators were set to appropriate values. Meanwhile, the ECM 114 may set actuator values for fast actuators to values that, given the slow actuator values, cause the engine system 100 to produce the immediate torque request instead of the predicted torque request.

The fast actuator values therefore cause the engine system 100 to produce the immediate torque request. When the ECM 114 decides to transition the axle torque from the immediate torque request to the predicted torque request, the ECM 114 changes the actuator values for one or more fast actuators to values that correspond to the predicted torque request. Because the slow actuator values have already been set based on the predicted torque request, the engine system 100 is able to produce the predicted torque request after only the delay imposed by the fast actuators. In other words, the longer delay that would otherwise result from changing axle torque using slow actuators is avoided.

For example only, when the predicted torque request is equal to the driver torque request, a torque reserve may be created when the immediate torque request is less than the driver torque request due to a temporary torque reduction request. Alternatively, a torque reserve may be created by increasing the predicted torque request above the driver torque request while maintaining the immediate torque request at the driver torque request. The resulting torque reserve can absorb sudden increases in required axle torque. For example only, sudden loads from an air conditioner or a power steering pump may be counterbalanced by increasing the immediate torque request. If the increase in immediate torque request is less than the torque reserve, the increase can be quickly produced by using fast actuators. The predicted torque request may then also be increased to re-establish the previous torque reserve.

Another example use of a torque reserve is to reduce fluctuations in slow actuator values. Because of their relatively slow speed, varying slow actuator values may produce control instability. In addition, slow actuators may include mechanical parts, which may draw more power and/or wear more quickly when moved frequently. Creating a sufficient torque reserve allows changes in desired torque to be made by varying fast actuators via the immediate torque request while maintaining the values of the slow actuators. For example, to maintain a given idle speed, the immediate torque request may vary within a range. If the predicted torque request is set to a level above this range, variations in the immediate torque request that maintain the idle speed can be made using fast actuators without the need to adjust slow actuators.

For example only, in a spark-ignition engine, spark timing may be a fast actuator value, while throttle opening area may be a slow actuator value. Spark-ignition engines may combust fuels including, for example, gasoline and ethanol, by applying a spark. By contrast, in a compression-ignition engine, fuel flow may be a fast actuator value, while throttle opening area may be used as an actuator value for engine characteristics other than torque. Compression-ignition engines may combust fuels including, for example, diesel, by compressing the fuels.

When the engine 102 is a spark-ignition engine, the spark actuator module 126 may be a fast actuator and the throttle actuator module 116 may be a slow actuator. After receiving a new actuator value, the spark actuator module 126 may be able to change spark timing for the following firing event. When the spark timing (also called spark advance) for a firing event is set to a calibrated value, maximum torque is produced in the combustion stroke immediately following the firing event. However, a spark advance deviating from the calibrated value may reduce the amount of torque produced in the combustion stroke. Therefore, the spark actuator module 126 may be able to vary engine output torque as soon as the next firing event occurs by varying spark advance. For example only, a table of spark advances corresponding to different engine operating conditions may be determined during a calibration phase of vehicle design, and the calibrated value is selected from the table based on current engine operating conditions.

By contrast, changes in throttle opening area take longer to affect engine output torque. The throttle actuator module 116 changes the throttle opening area by adjusting the angle of the blade of the throttle valve 112. Therefore, once a new actuator value is received, there is a mechanical delay as the throttle valve 112 moves from its previous position to a new position based on the new actuator value. In addition, air flow changes based on the throttle valve opening are subject to air transport delays in the intake manifold 110. Further, increased air flow in the intake manifold 110 is not realized as an increase in engine output torque until the cylinder 118 receives additional air in the next intake stroke, compresses the additional air, and commences the combustion stroke.

Using these actuators as an example, a torque reserve can be created by setting the throttle opening area to a value that would allow the engine 102 to produce a predicted torque request. Meanwhile, the spark timing can be set based on an immediate torque request that is less than the predicted torque request. Although the throttle opening area generates enough air flow for the engine 102 to produce the predicted torque request, the spark timing is retarded (which reduces torque) based on the immediate torque request. The engine output torque will therefore be equal to the immediate torque request.

When additional torque is needed, such as when the air conditioning compressor is started, or when traction control determines wheel slip has ended, the spark timing can be set based on the predicted torque request. By the following firing event, the spark actuator module 126 may return the spark advance to a calibrated value, which allows the engine 102 to produce the full engine output torque achievable with the air flow already present. The engine output torque may therefore be quickly increased to the predicted torque request without experiencing delays from changing the throttle opening area.

When the engine 102 is a compression-ignition engine, the fuel actuator module 124 may be a fast actuator and the throttle actuator module 116 and the boost actuator module 164 may be emissions actuators. In this manner, the fuel mass may be set based on the immediate torque request, and the throttle opening area and boost may be set based on the predicted torque request. The throttle opening area may generate more air flow than necessary to satisfy the predicted torque request. In turn, the air flow generated may be more than required for complete combustion of the injected fuel such that the air/fuel ratio is usually lean and changes in air flow do not affect the engine output torque. The engine output torque will therefore be equal to the immediate torque request and may be increased or decreased by adjusting the fuel flow.

The throttle actuator module 116, the boost actuator module 164, and the EGR actuator module 172 may be controlled based on the predicted torque request to control emissions and to minimize turbo lag. The throttle actuator module 116 may create a vacuum to draw exhaust gases through the EGR valve 170 and into the intake manifold 110.

The axle torque arbitration module 204 may output the predicted torque request and the immediate torque request to a propulsion torque arbitration module 206. The predicted and immediate torque requests received by the propulsion torque arbitration module 206 are converted from an axle torque domain (torque at the wheels) into a propulsion torque domain (torque at the crankshaft).

The propulsion torque arbitration module 206 arbitrates between propulsion torque requests, including the converted predicted and immediate torque requests. The propulsion torque arbitration module 206 generates an arbitrated predicted torque request and an arbitrated immediate torque request. The arbitrated torques may be generated by selecting a winning request from among received requests. Alternatively or additionally, the arbitrated torques may be generated by modifying one of the received requests based on another one or more of the received requests.

Other propulsion torque requests may include torque reductions for engine over-speed protection, torque increases for stall prevention, and torque reductions requested by the transmission control module 194 to accommodate gear shifts. Propulsion torque requests may also result from clutch fuel cutoff, which reduces the engine output torque when the driver depresses the clutch pedal in a manual transmission vehicle to prevent a flare (rapid rise) in engine speed.

Propulsion torque requests may also include an engine shutoff request, which may be initiated when a critical fault is detected. For example only, critical faults may include detection of vehicle theft, a stuck starter motor, electronic throttle control problems, and unexpected torque increases. In various implementations, when an engine shutoff request is present, arbitration selects the engine shutoff request as the winning request. When the engine shutoff request is present, the propulsion torque arbitration module 206 may output zero as the arbitrated torques.

In various implementations, an engine shutoff request may simply shut down the engine 102 separately from the arbitration process. The propulsion torque arbitration module 206 may still receive the engine shutoff request so that, for example, appropriate data can be fed back to other torque requestors. For example, all other torque requestors may be informed that they have lost arbitration.

A speed control module 210 may also output predicted and immediate torque requests to the propulsion torque arbitration module 206. The torque requests from the speed control module 210 may prevail in arbitration when the ECM 114 is in a speed mode. The speed mode may be activated when the driver removes their foot from the accelerator pedal, such as when the vehicle is idling or coasting down from a higher speed. Alternatively or additionally, the speed mode may be activated when the predicted torque request from the axle torque arbitration module 204 is less than a predetermined torque value.

The speed control module 210 receives a desired speed from a speed trajectory module 212, and controls the predicted and immediate torque requests to reduce the difference between the desired speed and the engine speed measured by the ES sensor 180. For example only, the speed trajectory module 212 may output a linearly decreasing desired speed for vehicle coastdown until an idle speed is reached. The speed trajectory module 212 may then continue outputting the idle speed as the desired speed.

The speed control module 210 may create a torque reserve in anticipation of an accessory load that may cause the engine 102 to stall when the ECM 114 is in the speed mode. The speed control module 210 may output this torque reserve to the driver torque module 202.

A reserves/loads module 220 receives the arbitrated predicted and immediate torque requests from the propulsion torque arbitration module 206. The reserves/loads module 220 may adjust the arbitrated predicted and immediate torque requests to create a torque reserve and/or to compensate for one or more loads. The reserves/loads module 220 then outputs the adjusted predicted and immediate torque requests to an actuation module 224.

For example only, a catalyst light-off process or a cold start emissions reduction process may require retarded spark advance. The reserves/loads module 220 may therefore increase the adjusted predicted torque request above the adjusted immediate torque request to create retarded spark for the cold start emissions reduction process. In another example, the air/fuel ratio of the engine and/or the mass air flow may be directly varied, such as by diagnostic intrusive equivalence ratio testing and/or new engine purging. Before beginning these processes, a torque reserve may be created or increased to quickly offset decreases in engine output torque that result from leaning the air/fuel mixture during these processes.

The reserves/loads module 220 may also create or increase a torque reserve in anticipation of a future load, such as power steering pump operation or engagement of an air conditioning (A/C) compressor clutch. The reserve for engagement of the A/C compressor clutch may be created when the driver first requests air conditioning. The reserves/loads module 220 may increase the adjusted predicted torque request while leaving the adjusted immediate torque request unchanged to produce the torque reserve. Then, when the A/C compressor clutch engages, the reserves/loads module 220 may increase the immediate torque request by the estimated load of the A/C compressor clutch.

The actuation module 224 receives the adjusted predicted and immediate torque requests from the reserves/loads module 220. The actuation module 224 determines how the adjusted predicted and immediate torque requests will be achieved. The actuation module 224 may be engine type specific. For example, the actuation module 224 may be implemented differently or use different control schemes for spark-ignition engines versus compression-ignition engines.

In various implementations, the actuation module 224 may define a boundary between modules that are common across all engine types and modules that are engine type specific. For example, engine types may include spark-ignition and compression-ignition. Modules prior to the actuation module 224, such as the propulsion torque arbitration module 206, may be common across engine types, while the actuation module 224 and subsequent modules may be engine type specific.

For example, in a spark-ignition engine, the actuation module 224 may vary the opening of the throttle valve 112 as a slow actuator that allows for a wide range of torque control. The actuation module 224 may disable cylinders using the cylinder actuator module 120, which also provides for a wide range of torque control, but may also be slow and may involve drivability and emissions concerns. The actuation module 224 may use spark timing as a fast actuator. However, spark timing may not provide as much range of torque control. In addition, the amount of torque control possible with changes in spark timing (referred to as spark reserve capacity) may vary as air flow changes.

In various implementations, the actuation module 224 may generate an air torque request based on the adjusted predicted torque request. The air torque request may be equal to the adjusted predicted torque request, setting air flow so that the adjusted predicted torque request can be achieved by changes to other actuators.

An air control module 228 may determine desired actuator values based on the air torque request. For example, the air control module 228 may control desired manifold absolute pressure (MAP), desired throttle area, and/or desired air per cylinder (APC). Desired MAP may be used to determine desired boost, and desired APC may be used to determine desired cam phaser positions. In various implementations, the air control module 228 may also determine an amount of opening of the EGR valve 170.

The actuation module 224 may also generate a spark torque request, a cylinder shut-off torque request, and a fuel torque request. The spark torque request may be used by a spark control module 232 to determine how much to retard the spark timing (which reduces engine output torque) from a calibrated spark advance.

The cylinder shut-off torque request may be used by a cylinder control module 236 to determine how many cylinders to deactivate. The cylinder control module 236 may instruct the cylinder actuator module 120 to deactivate one or more cylinders of the engine 102. In various implementations, a predefined group of cylinders may be deactivated jointly.

The cylinder control module 236 may also instruct a fuel control module 240 to stop providing fuel for deactivated cylinders and may instruct the spark control module 232 to stop providing spark for deactivated cylinders. In various implementations, the spark control module 232 only stops providing spark for a cylinder once any fuel/air mixture already present in the cylinder has been combusted.

In various implementations, the cylinder actuator module 120 may include a hydraulic system that selectively decouples intake and/or exhaust valves from the corresponding camshafts for one or more cylinders in order to deactivate those cylinders. For example only, valves for half of the cylinders are either hydraulically coupled or decoupled as a group by the cylinder actuator module 120. In various implementations, cylinders may be deactivated simply by halting provision of fuel to those cylinders, without stopping the opening and closing of the intake and exhaust valves. In such implementations, the cylinder actuator module 120 may be omitted.

The fuel control module 240 may vary the amount of fuel provided to each cylinder based on the fuel torque request from the actuation module 224. During normal operation of a spark-ignition engine, the fuel control module 240 may operate in an air lead mode in which the fuel control module 240 attempts to maintain a stoichiometric air/fuel ratio by controlling fuel flow based on air flow. The fuel control module 240 may determine a fuel mass that will yield stoichiometric combustion when combined with the current amount of air per cylinder. The fuel control module 240 may instruct the fuel actuator module 124 via the fueling rate to inject this fuel mass for each activated cylinder.

In compression-ignition systems, the fuel control module 240 may operate in a fuel lead mode in which the fuel control module 240 determines a fuel mass for each cylinder that satisfies the fuel torque request while minimizing emissions, noise, and fuel consumption. In the fuel lead mode, air flow is controlled based on fuel flow and may be controlled to yield a lean air/fuel ratio. In addition, the air/fuel ratio may be maintained above a predetermined level, which may prevent black smoke production in dynamic engine operating conditions.

A mode setting may determine how the actuation module 224 treats the adjusted immediate torque request. The mode setting may be provided to the actuation module 224, such as by the propulsion torque arbitration module 206, and may select modes including an inactive mode, a pleasibility mode, a maximum range mode, and an auto actuation mode.

In the inactive mode, the actuation module 224 may ignore the adjusted immediate torque request and set engine output torque based on the adjusted predicted torque request. The actuation module 224 may therefore set the spark torque request, the cylinder shut-off torque request, and the fuel torque request to the adjusted predicted torque request, which maximizes engine output torque for the current engine air flow conditions. Alternatively, the actuation module 224 may set these requests to predetermined (such as out-of-range high) values to disable torque reductions from retarding spark, deactivating cylinders, or reducing the fuel/air ratio.

In the pleasibility mode, the actuation module 224 outputs the adjusted predicted torque request as the air torque request and attempts to achieve the adjusted immediate torque request by adjusting only spark advance. The actuation module 224 therefore outputs the adjusted immediate torque request as the spark torque request. The spark control module 232 will retard the spark as much as possible to attempt to achieve the spark torque request. If the desired torque reduction is greater than the spark reserve capacity (the amount of torque reduction achievable by spark retard), the torque reduction may not be achieved. The engine output torque will then be greater than the adjusted immediate torque request.

In the maximum range mode, the actuation module 224 may output the adjusted predicted torque request as the air torque request and the adjusted immediate torque request as the spark torque request. In addition, the actuation module 224 may decrease the cylinder shut-off torque request (thereby deactivating cylinders) when reducing spark advance alone is unable to achieve the adjusted immediate torque request.

In the auto actuation mode, the actuation module 224 may decrease the air torque request based on the adjusted immediate torque request. In various implementations, the air torque request may be reduced only so far as is necessary to allow the spark control module 232 to achieve the adjusted immediate torque request by adjusting spark advance. Therefore, in auto actuation mode, the adjusted immediate torque request is achieved while adjusting the air torque request as little as possible. In other words, the use of relatively slowly-responding throttle valve opening is minimized by reducing the quickly-responding spark advance as much as possible. This allows the engine 102 to return to producing the adjusted predicted torque request as quickly as possible.

A torque estimation module 244 may estimate torque output of the engine 102. This estimated torque may be used by the air control module 228 to perform closed-loop control of engine air flow parameters, such as throttle area, MAP, and phaser positions. For example, a torque relationship such as $$T=f(APC,S,I,E,AF,OT,\#) \quad (1)$$

may be defined, where torque (T) is a function of air per cylinder (APC), spark advance (S), intake cam phaser position (I), exhaust cam phaser position (E), air/fuel ratio (AF), oil temperature (OT), and number of activated cylinders (#). Additional variables may also be accounted for, such as the degree of opening of an exhaust gas recirculation (EGR) valve.

This relationship may be modeled by an equation and/or may be stored as a lookup table. The torque estimation module 244 may determine APC based on measured MAF and current ES, thereby allowing closed loop air control based on actual air flow. The intake and exhaust cam phaser positions used may be based on actual positions, as the phasers may be traveling toward desired positions.

The actual spark advance may be used to estimate the actual engine output torque. When a calibrated spark advance value is used to estimate torque, the estimated torque may be called an estimated air torque, or simply air torque. The air torque is an estimate of how much torque the engine could generate at the current air flow if spark retard was removed (i.e., spark timing was set to the calibrated spark advance value) and all cylinders were fueled.

The air control module 228 may output a desired area signal to the throttle actuator module 116. The throttle actuator module 116 then regulates the throttle valve 112 to produce the desired throttle area. The air control module 228 may generate the desired area signal based on an inverse torque model and the air torque request. The air control module 228 may use the estimated air torque and/or the MAF signal in order to perform closed loop control. For example, the desired area signal may be controlled to minimize a difference between the estimated air torque and the air torque request.

The air control module 228 may output a desired manifold absolute pressure (MAP) signal to a boost scheduling module 248. The boost scheduling module 248 uses the desired MAP signal to control the boost actuator module 164. The boost actuator module 164 then controls one or more turbochargers (e.g., the turbocharger including the turbine 160-1 and the compressor 160-2) and/or superchargers.

The air control module 228 may also output a desired air per cylinder (APC) signal to a phaser scheduling module 252. Based on the desired APC signal, the phaser scheduling module 252 may control positions of the intake and/or exhaust cam phasers 148 and 150 using the phaser actuator module 158.

Referring back to the spark control module 232, calibrated spark advance values may vary based on various engine operating conditions. For example only, a torque relationship may be inverted to solve for desired spark advance. For a given torque request ($T_{des}$), the desired spark advance ($S_{des}$) may be determined based on $$S_{des}=T^{-1}(T_{des},APC,I,E,AF,OT,\#). \quad (2)$$

This relationship may be embodied as an equation and/or as a lookup table. The air/fuel ratio (AF) may be the actual air/fuel ratio, as reported by the fuel control module 240.

When the spark advance is set to the calibrated spark advance, the resulting torque may be as close to mean best torque (MBT) as possible. MBT refers to the maximum engine output torque that is generated for a given air flow as spark advance is increased, while using fuel having an octane rating greater than a predetermined threshold and using stoichiometric fueling. The spark advance at which this maximum torque occurs is referred to as MBT spark. The calibrated spark advance may differ slightly from MBT spark because of, for example, fuel quality (such as when lower octane fuel is used) and environmental factors. The torque at the calibrated spark advance may therefore be less than MBT.

Referring back to the driver torque module 202, torque shaping is performed to eliminate bump and kick when the ECM 114 is in the pleasibility mode. The driver torque module 202 activates and deactivates the pleasibility mode, and shapes the predicted and immediate torque requests, based on operating conditions of the engine system 100. The operating conditions may include the engine speed from the ES sensor 180, the vehicle speed from the VS sensor 193, the transmission input from the TCM 194, and the driver input from the driver input module 104. The operating conditions may also include the torque reserve from the speed control module 210.

The driver torque module 202 outputs a mode setting to activate and deactivate the pleasibility mode. The actuation module 224 receives the mode setting. As discussed above, when the pleasibility mode is activated, the actuation module 224 may satisfy the adjusted immediate torque request by adjusting only spark advance.

Figure 3:
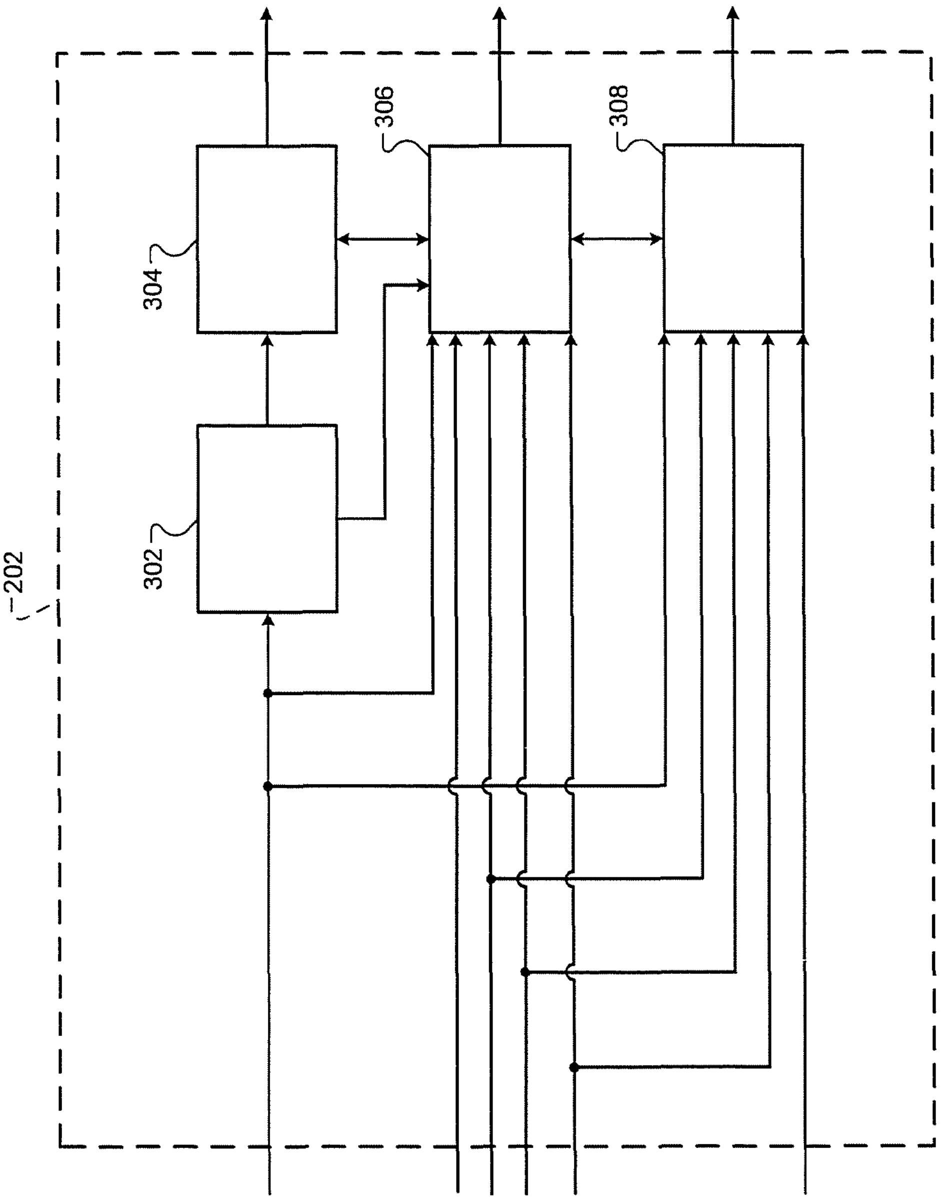
FIG. 3 is a functional block diagram of an example driver torque module included in the engine control system of FIG. 2.

Referring now to FIG. 3, the driver torque module 202 may include a driver torque determination module 302, a predicted torque shaping module 304, an immediate torque shaping module 306, and a mode selection module 308. The driver torque determination module 302 determines the driver torque request based on the driver input. The driver input may be based on a position of the accelerator pedal. The driver input may also be based on cruise control, which may be an adaptive cruise control system that varies vehicle speed to maintain a predetermined following distance. The driver torque determination module 302 may store one or more mappings of accelerator pedal position to desired torque, and may determine the driver torque request based on a selected one of the mappings.

The predicted torque shaping module 304 shapes the predicted torque request based on the driver torque request, and the immediate torque shaping module 306 shapes the immediate torque requests based on the driver torque request. The predicted and immediate torque requests are shaped independently, providing flexibility to adjust both slow actuators and fast actuators to satisfy torque shaping requirements. Although the present disclosure discusses shaping the immediate torque request in more detail below, the predicted torque request may be shaped in a similar manner.

The immediate torque shaping module 306 shapes the immediate torque request based on inputs received from sensors and/or other modules. The sensor inputs may include the engine coolant temperature from the ECT sensor 182, the engine speed from the ES sensor 180, and vehicle speed from the VS sensor 193. The module inputs may include the driver torque request from the driver torque determination module 302, the driver input from the driver input module 104, and the transmission input from the TCM module 194.

The mode selection module 308 outputs the mode setting to select or deselect the pleasibility mode. The mode selection module 308 may select or deselect the pleasibility mode based on the engine speed from the ES sensor 180 and/or based on inputs received from other modules. The module inputs may include the driver input from the driver input module 104, the transmission input from the TCM module 194, and the torque reserve from the speed control module 210. The module inputs may also include the driver torque request from the driver torque determination module 302 and the immediate torque request from the immediate torque shaping module 306.

The mode selection module 308 may also activate and deactivate the pleasibility mode based on a gear slip and a response time. The gear slip is a difference between the engine speed and the turbine speed. The response time is the time that elapses after the driver depresses the accelerator pedal. The mode selection module 308 may determine the gear slip and the response time and may output the gear slip and the response time to the immediate torque shaping module 306. Alternatively, the mode selection module 308 may receive the gear slip and the response time from other modules, including the immediate torque shaping module 306.

Figure 4:
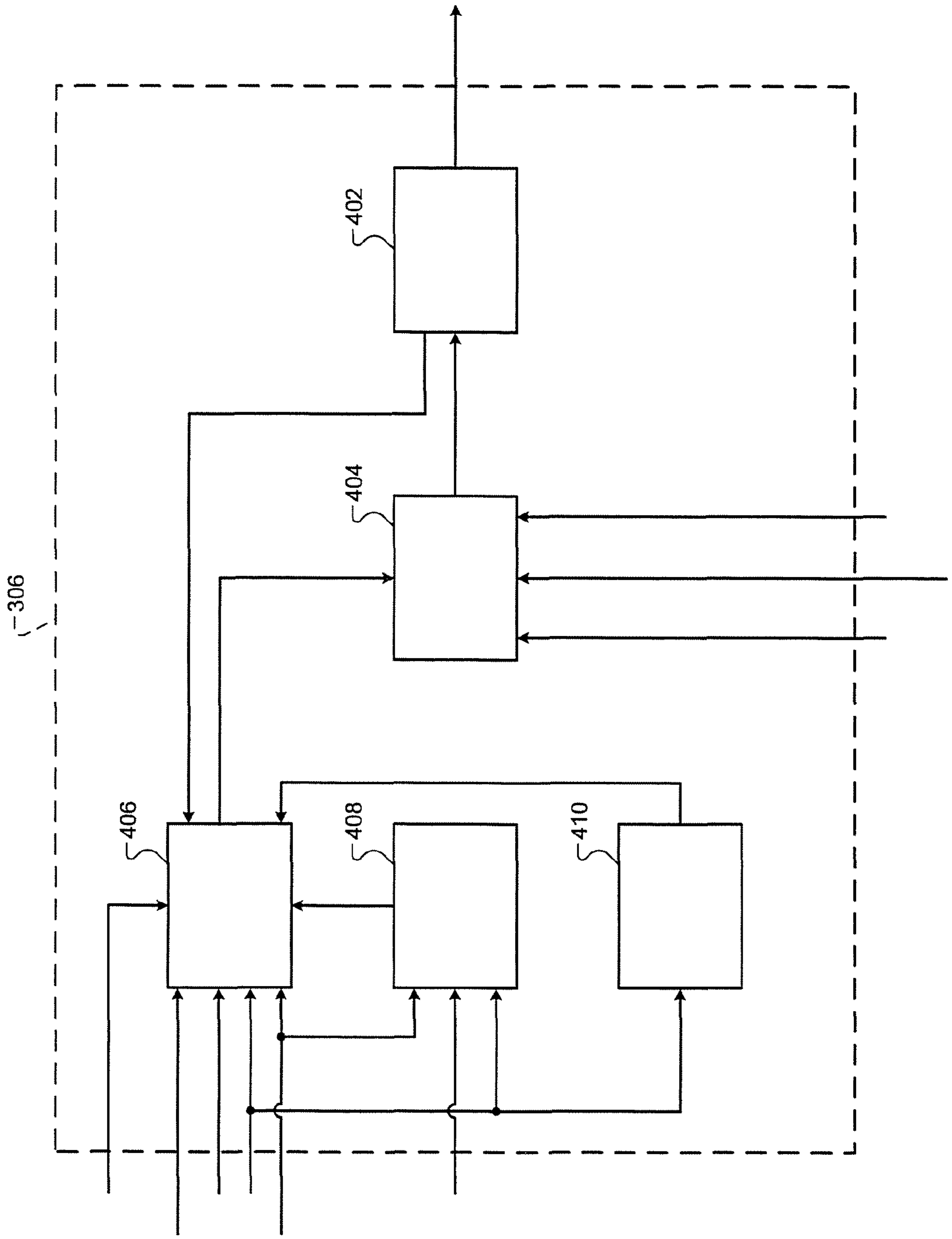
FIG. 4 is a functional block diagram of an example immediate torque shaping module included in the driver torque module of FIG. 3.

Referring now to FIG. 4, the immediate torque shaping module 306 includes an immediate torque determination module 402, an adjustment rate determination module 404, and a rate limit determination module 406. The immediate torque determination module 402 determines the immediate torque request based on an adjustment rate from the adjustment rate determination module 404. The immediate torque determination module 402 may store a previous immediate torque request determined in a previous control loop iteration, and may determine the immediate torque request based on the previous immediate torque request.

The adjustment rate may be a percentage, in which case the immediate torque determination module 402 may determine an adjustment amount based on a product of the previous immediate torque request and the adjustment rate. The immediate torque determination module 402 may determine the immediate torque request based on a sum of the previous immediate torque request and the adjustment amount. The adjustment rate may be a torque value, in which case the immediate torque determination module 404 may determine the immediate toque request based on a sum of the previous immediate torque request and the adjustment rate.

The adjustment rate determination module 404 may determine the adjustment rate based on the driver torque request from the driver torque determination module 302 and the response time from the mode selection module 308. The adjustment rate may be determined to ensure that the response time is less than a predetermined time when the vehicle acceleration is equal to a predetermined percentage of a peak acceleration requested by the driver. The predetermined time may be 0.4 seconds (s) or less and the predetermined percentage may be 50 percent.

The adjustment rate determination module 404 also determines the adjustment rate based on a rate limit when the mode setting from the mode selection module 308 indicates that the pleasibility mode is activated. The adjustment rate determination module 404 may determine the adjustment rate as discussed above, and then apply the rate limit to limit the adjustment rate when pleasibility mode is activated. Applying the rate limit may decrease the adjustment rate when a difference between the immediate torque and the lash zone torque is less than a torque threshold. For example, the torque threshold may be between 0 Newton-meters (Nm) and 50 Nm.

The rate limit determination module 406 may receive inputs from sensors and other modules. The sensor inputs may include the engine coolant temperature from the ECT sensor 182, the engine speed from the ES sensor 180, and vehicle speed from the VS sensor 193. The module inputs may include the gear slip from the mode selection module 308, the driver input from the driver input module 104, and the transmission input from the TCM module 194. Additionally, the rate limit module may receive inputs from a lash zone torque determination module 408 and an engine acceleration determination module 410.

The lash zone torque determination module 408 determines the lash zone torque based on the engine speed and the transmission gear. The lash zone torque may also be determined based on the vehicle speed and/or vehicle acceleration. The vehicle acceleration may be determined by differentiating the vehicle speed. The lash zone torque may be determined based on a predetermined relationship between the engine speed, the transmission gear, the vehicle speed, and the lash zone torque.

The engine acceleration determination module 410 determines engine acceleration based on the engine speed. The engine acceleration determination module 410 may differentiate the engine speed to obtain the engine acceleration. The rate limit determination module 406 receives the lash zone torque from the lash zone torque determination module 408 and receives the engine acceleration from the engine acceleration determination module 410.

The rate limit determination module 406 determines the rate limit based on lash zone proximity. The lash zone proximity is a difference between the lash zone torque and the previous immediate torque request. The rate limit may be decreased as the lash zone proximity decreases. In this manner, the rate limit decreases the adjustment rate of the immediate torque request in the lash zone, thereby limiting torque output of the engine system 100 to eliminate bump and kick.

The rate limit determination module 406 may also determine the rate limit based on the transmission gear, the engine speed, the engine acceleration, the vehicle speed, the gear slip, the pedal position, and the engine coolant temperature. The rate limit may be determined based on the lash zone proximity and the transmission gear, and then modified based on the engine speed, the engine acceleration, the vehicle speed, the gear slip, the pedal position, and/or the engine coolant temperature. The rate limit may be directly related or inversely related to these inputs based on acceleration feel and other factors, such as emissions.

The rate limit may be directly related to the transmission gear, the engine speed, the gear slip, and a pedal depression percentage. The pedal depression percentage may be determined based on the pedal position. The rate limit may be inversely related to the engine acceleration and the engine coolant temperature.

Figure 5:
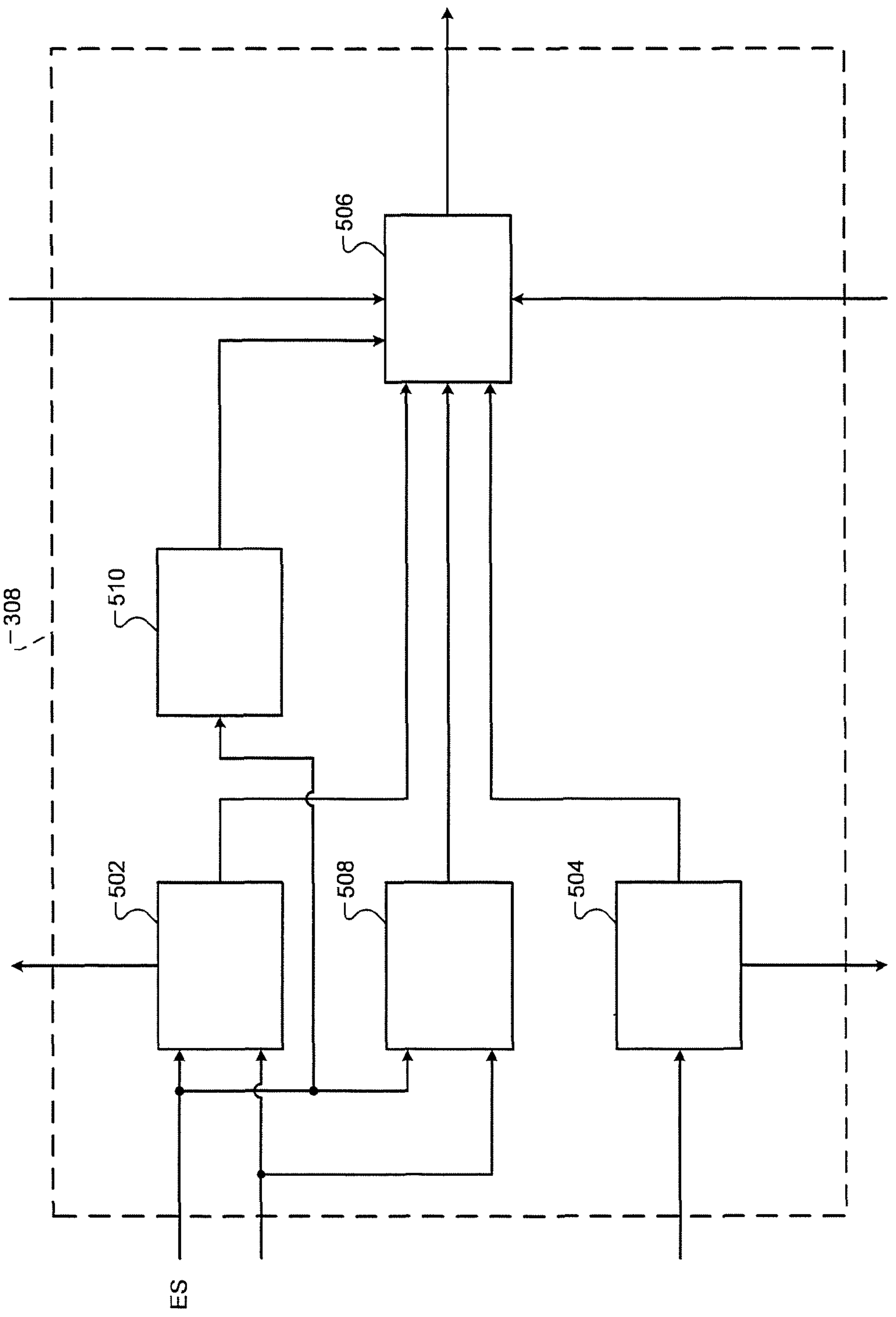
FIG. 5 is a functional block diagram of an example mode selection module included in the driver torque module of FIG. 3.

Referring now to FIG. 5, the mode selection module 308 includes a gear slip determination module 502, a response time determination module 504, and a mode activation module 506. The gear slip determination module 502 receives the engine speed from the ES sensor 180 and receives the transmission input from the TCM 194. The gear slip determination module 502 determines the gear slip based on the difference between the engine speed and the turbine speed.

The response time determination module 504 receives the driver input from the driver input module 104. The response time determination module 504 determines the response time based on the pedal position. The response time may be determined using a timer that elapses when the driver depresses the accelerator pedal.

The mode activation module 506 receives the gear slip from the gear slip determination module 502 and the response time from the response time determination module 504. The mode activation module 506 activates and deactivates the pleasibility mode via the mode setting based on the gear slip and the response time.

The mode activation module 506 activates the pleasibility mode as the engine output torque approaches the lash zone.

The gear slip and the response time may be used to determine when the engine output torque is approaching the lash zone. Thus, the mode activation module 506 may activate the pleasibility mode when the gear slip is greater than a first slip threshold and/or when the response time is greater than a first time threshold. The first slip threshold may be between 0 revolutions per minute (rpm) and 100 rpm, or about 0 rpm. The first time threshold may be between 0.2 s and 0.4 s, or about 0.2 s.

The mode activation module 506 deactivates the pleasibility mode when the engine output torque is outside of the lash zone. The mode activation module 506 may deactivate the pleasibility mode when the gear slip is greater than a second slip threshold and/or when the response time is greater than a second time threshold. The second slip threshold may be between 200 rpm and 300 rpm, or about 200 rpm. The second time threshold may be between 0.4 s and 0.5 s, or about 0.4 s.

In various conditions, the pleasibility mode may be activated when the driver tips out (i.e., releases the accelerator pedal) to minimize bump and sail on. Sail on occurs when the vehicle accelerates rather than decelerating as requested by the driver. When the pleasibility mode is activated when the driver tips out, the pleasibility mode may be active when the driver tips in (i.e., depresses the accelerator pedal). In addition, the pleasibility mode may be kept active until the gear slip is greater than the second slip threshold and/or the response time is greater than a second time threshold.

The mode selection module 308 may also include a torque output determination module 508 and a pedal torque determination module 510. The output torque determination module 508 receives the engine speed from the ES sensor 180 and the transmission input from the TCM 194. The output torque determination module 508 determines the engine output torque based on the engine speed and the transmission gear.

The pedal torque determination module 510 determines a zero pedal torque based on a desired engine torque. The zero pedal torque is the torque value when the driver is off the accelerator pedal (i.e., when the accelerator pedal is in a zero accelerator pedal position). The desired engine torque may be adjusted to maintain the engine speed at a desired speed, which may be predetermined.

The mode activation module 506 may receive the engine output torque from the output torque determination module 508 and the zero pedal torque from the pedal torque determination module 510. The mode activation module 506 may also receive torque reserve from the speed control module 210 and the immediate torque request from the immediate torque shaping module 306.

The mode activation module 506 may activate and deactivate the pleasibility mode based on the engine torque output, the zero pedal torque, the immediate torque request, and the torque reserve. The pleasibility mode may be activated when the torque reserve is greater than zero. The pleasibility mode may be deactivated when a difference between the immediate torque request and the engine torque output or the zero pedal torque is greater than a torque threshold.

Figure 6:
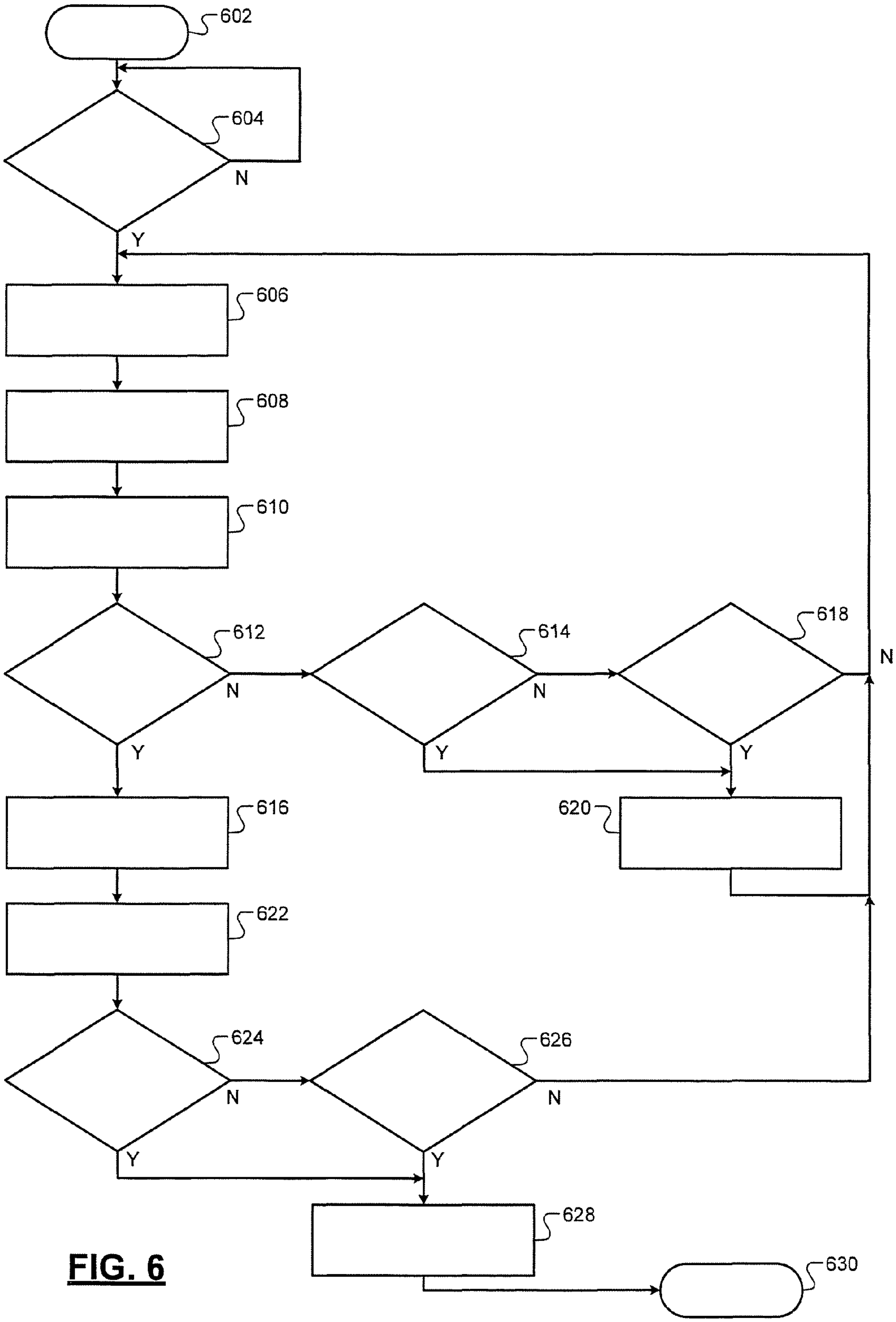
FIG. 6 is a flowchart illustrating an example torque control method according to the principles of the present disclosure.

Referring now to FIG. 6, a method for controlling torque begins at 602. At 604, the method determines whether a driver has depressed an accelerator pedal while a vehicle is coasting. The method may make this determination based on an accelerator pedal position. If 604 is false, the method continues to make this determination at 604. If 604 is true, the method continues at 606.

At 606, the method increases an immediate torque request based on the amount that the accelerator pedal is depressed. At 608, the method determines a response time. The response time may be determined using a timer that starts when the driver depresses the accelerator pedal. At 610, the method determines a gear slip. The gear slip is a difference between an engine speed and a turbine speed.

At 612, the method determines whether a pleasibility mode is activated. The pleasibility mode may be active prior to tip in if activated during tip out. If 612 is false, the method continues at 614. If 612 is true, the method continues at 620. In the pleasibility mode, an adjustment rate of the immediate torque request is limited to limit an engine output torque in a lash zone. This limits the rate of acceleration in the lash zone, thereby eliminating bump and kick to improve driver feel during acceleration.

At 614, the method determines whether the response time is greater than a first time threshold. The first time threshold may be predetermined such that the response time is greater than the first time threshold as the engine output torque approaches the lash zone. The first time threshold may be between 0.2 s and 0.4 s, or about 0.2 s. If 614 is false, the method continues to 618. If 614 is true, the method continues at 620.

At 618, the method determines whether the gear slip is greater than a first slip threshold. The first slip threshold may be predetermined such that the gear slip is greater than the first slip threshold as the engine output torque approaches the lash zone. The first slip threshold may be between 0 rpm and 100 rpm, or about 0 rpm. If 618 is false, the method continues to 606. If 618 is true, the method continues at 620. At 620, the method activates the pleasibility mode and continues to 606.

At 616, the method determines a lash zone torque. The method determines the lash zone torque based on an engine speed and a transmission gear. The method may also determine the lash zone torque based on vehicle speed and/or vehicle acceleration. Vehicle acceleration may be determined by differentiating the vehicle speed. The method continues at 622.

At 622, the method limits the torque adjustment rate of the immediate torque request. The method may limit the torque adjustment rate based on a rate limit. The rate limit is determined based on a transmission gear and a difference between the lash zone torque and a previous immediate torque request. The rate limit may also be determined based on gear slip, engine speed, engine acceleration, and pedal position.

At 624, the method determines whether the response time is greater than a second time threshold. The second time threshold may be predetermined such that the response time is greater than the second time threshold when the engine output torque has passed through lash zone. The second time threshold may be between 0.4 s and 0.5 s, or about 0.4 s. If 624 is false, the method continues to 626. If 624 is true, the method continues at 628.

At 626, the method determines whether the gear slip is greater than a second slip threshold. The second slip threshold may be predetermined such that the gear slip is greater than the second slip threshold when the engine output torque has passed through the lash zone. The second slip threshold may be between 200 rpm and 300 rpm, or about 200 rpm. If 626 is false, the method continues to 606. If 626 is true, the method continues at 628.

At 628, the method deactivates the pleasibility mode. The method may deactivate the pleasibility mode based on other engine operating conditions and/or control values. For example, the method may deactivate the pleasibility mode based on a difference between the immediate torque request and the engine output torque. In addition, the method may deactivate the pleasibility mode based on a difference between a zero pedal torque and the engine output torque. The method ends at 630.

Figure 7:
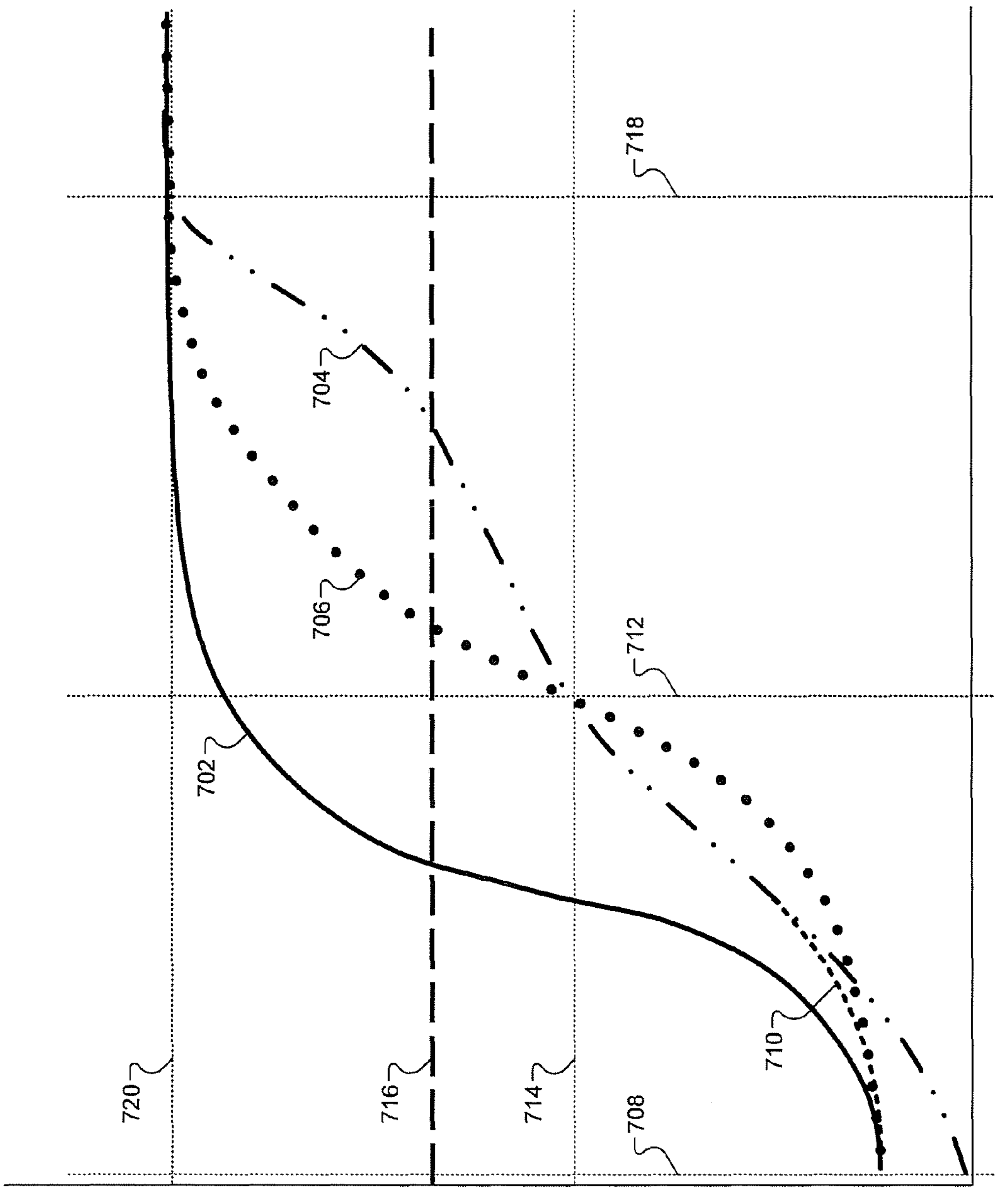
FIG. 7 is a graph illustrating example torque control signals and a resulting engine torque output according to the principles of the present disclosure.

Referring now to FIG. 7, a graph illustrates a predicted torque request 702 and an immediate torque request 704 according to the principles of the present disclosure. The predicted torque request 702 and the immediate torque request 704 yield an engine output torque 706. The predicted torque request 702 and the immediate torque request 704 are generated in response to a driver tip in, which occurs at 708. After the driver tip in, the predicted torque request 702 and the immediate torque request 704 are increased based on a percentage of accelerator pedal depression.

The immediate torque request 704 represents an immediate torque request when a pleasibility mode is active when the driver tips in. In various conditions, the pleasibility mode may be activated during tip out and may be kept active when the driver tips in. An immediate torque request 710 represents an immediate torque request when the driver tips in while the pleasibility mode is inactive. The immediate torque request 710 is greater than the immediate torque request 704 when the driver tips in because the immediate torque request 704 is limited in the pleasibility mode.

At 712, if the pleasibility mode was inactive during the previous tip out, then the pleasibility mode is activated to limit an adjustment rate of the immediate torque request 704. The pleasibility mode may be activated when the immediate torque request 704 is greater than a first torque threshold 714. Alternatively, the pleasibility mode may be activated when a response time is greater than a first time threshold and/or when a gear slip is greater than a first slip threshold. In either case, the pleasibility mode is activated when the immediate torque request 704 is less than a lash zone torque 716. In turn, the adjustment rate of the immediate torque request 704 is limited when the immediate torque request 704 is at or near the lash zone torque 716.

At 718, the pleasibility mode is deactivated and shaping of the immediate torque requests 704, 710 is stopped. The pleasibility mode may be deactivated when the immediate torque requests 704, 710 are greater than a second torque threshold 720. Alternatively, the pleasibility mode may be deactivated when the response time is greater than a second time threshold and/or when the gear slip is greater than a second slip threshold. In either case, the pleasibility mode is deactivated when the immediate torque request 704 is greater than the lash zone torque 716.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system, comprising:

a driver torque determination module that determines a driver torque request when a driver depresses an accelerator pedal while a vehicle is coasting;

a lash zone torque determination module that determines a lash zone torque based on a transmission gear and an engine speed;

a rate limit determination module that determines an adjustment rate limit based on a previous immediate torque request, the lash zone torque, and the transmission gear; and an immediate torque determination module that determines a present immediate torque request based on the driver torque request and that determines the present immediate torque request based on the adjustment rate limit when a difference between the previous immediate torque request and the lash zone torque is less than a torque threshold; and an actuation module that controls an actuator of an engine based on the present immediate torque request.

2. A control system, comprising:

a driver torque determination module that determines a driver torque request when a driver depresses an accelerator pedal while a vehicle is coasting;

a lash zone torque determination module that determines a lash zone torque based on a transmission gear and an engine speed;

a rate limit determination module that determines an adjustment rate limit based on a previous immediate torque request, the lash zone torque, and the transmission gear;

an immediate torque determination module that determines a present immediate torque request based on the driver torque request and that selectively determines the present immediate torque request based on the adjustment rate limit;

a response time determination module that determines a response time based on time elapsed after the driver depresses the accelerator pedal;

a gear slip determination module that determines a gear slip based on the engine speed and a turbine speed, wherein the immediate torque determination module determines the present immediate torque request based on the adjustment rate limit and at least one of the response time and the gear slip; and an actuation module that controls an actuator of an engine based on the present immediate torque request.

3. The control system of claim 2, wherein the immediate torque determination module determines the present immediate torque request based on the adjustment rate limit when at least one of: the response time is greater than a time threshold; and the gear slip is greater than a slip threshold.

4. The control system of claim 2, wherein the immediate torque determination module refrains from determining the present immediate torque request based on the adjustment rate limit when at least one of: the response time is greater than a time threshold; and the gear slip is greater than a slip threshold.

5. The control system of claim 2, wherein the rate limit determination module determines the adjustment rate limit based on a pedal position, the gear slip, and the engine speed.

6. The control system of claim 2, further comprising an adjustment rate determination module that determines an adjustment rate based on the adjustment rate limit and the at least one of the response time and the gear slip, wherein the immediate torque determination module determines the present immediate torque request based on the adjustment rate.

7. The control system of claim 6, wherein the adjustment rate determination module decreases the adjustment rate while applying the adjustment rate limit when a difference between the previous immediate torque request and the lash zone torque is less than a torque threshold.

8. The control system of claim 2, further comprising:

an output torque determination module that determines an engine output torque based on the engine speed and the transmission gear; and a pedal torque determination module that determines a zero pedal torque based on a desired engine torque at a zero accelerator pedal position, wherein the immediate torque determination module determines the present immediate torque request based on the adjustment rate limit and at least one of the engine output torque and the zero pedal torque.

9. The control system of claim 2, further comprising a speed control module that selectively generates a torque reserve to prevent an engine stall when controlling an engine output torque based on a desired engine speed, wherein the immediate torque determination module determines the present immediate torque request based on the adjustment rate limit and the torque reserve.

10. The control system of claim 2, wherein the actuation module controls spark timing based on the present immediate torque request.

11. A method, comprising:

determining a driver torque request when a driver depresses an accelerator pedal while a vehicle is coasting;

determining a lash zone torque based on a transmission gear and an engine speed;

determining an adjustment rate limit based on a previous immediate torque request, the lash zone torque, and the transmission gear;

determining a present immediate torque request based on the driver torque request;

determining the present immediate torque request based on the adjustment rate limit when a difference between the previous immediate torque request and the lash zone torque is less than a torque threshold; and controlling an actuator of an engine based on the present immediate torque request.

12. A method, comprising:

determining a driver torque request when a driver depresses an accelerator pedal while a vehicle is coasting;

determining a lash zone torque based on a transmission gear and an engine speed;

determining an adjustment rate limit based on a previous immediate torque request, the lash zone torque, and the transmission gear;

determining a present immediate torque request based on the driver torque request;

selectively determining the present immediate torque request based on the adjustment rate limit;

determining a response time based on time elapsed after the driver depresses the accelerator pedal;

determining a gear slip based on the engine speed and a turbine speed;

determining the present immediate torque request based on the adjustment rate limit and at least one of the response time and the gear slip; and controlling an actuator of an engine based on the present immediate torque request.

13. The method of claim 12, further comprising determining the present immediate torque request based on the adjustment rate limit when at least one of: the response time is greater than a time threshold; and the gear slip is greater than a slip threshold.

14. The method of claim 12, further comprising refraining from determining the present immediate torque request based on the adjustment rate limit when at least one of: the response time is greater than a time threshold; and the gear slip is greater than a slip threshold.

15. The method of claim 12, further comprising determining the adjustment rate limit based on a pedal position, the gear slip, and the engine speed.

16. The method of claim 12, further comprising:

determining an adjustment rate based on the adjustment rate limit and the at least one of the response time and the gear slip; and determining the present immediate torque request based on the adjustment rate.

17. The method of claim 16, further comprising decreasing the adjustment rate while applying the adjustment rate limit when a difference between the previous immediate torque request and the lash zone torque is less than a torque threshold.

18. The method of claim 12, further comprising:

determining an engine output torque based on the engine speed and the transmission gear;

determining a zero pedal torque based on a desired engine torque at a zero accelerator pedal position; and determining the present immediate torque request based on the adjustment rate limit and at least one of the engine output torque and the zero pedal torque.

19. The method of claim 12, further comprising:

selectively generating a torque reserve to prevent an engine stall when controlling an engine output torque based on a desired engine speed; and determining the present immediate torque request based on the adjustment rate limit and the torque reserve.

20. The method of claim 12, further comprising controlling spark timing based on the present immediate torque request.

* * * * *